United States Patent
Madani et al.

(10) Patent No.: US 11,741,389 B2
(45) Date of Patent: Aug. 29, 2023

(54) METHOD FOR OBFUSCATION OF HARDWARE

(71) Applicant: University of Louisiana at Lafayette, Lafayette, LA (US)

(72) Inventors: Siroos Madani, Lafayette, LA (US); Mohammad R. Madani, Lafayette, LA (US); Magdy Bayoumi, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 1149 days.

(21) Appl. No.: 16/269,703

(22) Filed: Feb. 7, 2019

(65) Prior Publication Data
US 2020/0226492 A1    Jul. 16, 2020

Related U.S. Application Data

(60) Provisional application No. 62/628,552, filed on Feb. 9, 2018.

(51) Int. Cl.
| | |
|---|---|
| *G06F 21/75* | (2013.01) |
| *G06N 20/00* | (2019.01) |
| *H03K 19/20* | (2006.01) |
| *H03K 19/21* | (2006.01) |

(52) U.S. Cl.
CPC .............. *G06N 20/00* (2019.01); *G06F 21/75* (2013.01); *H03K 19/20* (2013.01); *H03K 19/21* (2013.01)

(58) Field of Classification Search
CPC .......... G06N 20/00; G06N 3/063; G06N 3/08; G06F 21/75; H03K 19/20; H03K 19/21
See application file for complete search history.

(56) References Cited

U.S. PATENT DOCUMENTS

| | | | | |
|---|---|---|---|---|
| 6,181,611 | B1 * | 1/2001 | Liu | G11C 8/08 365/230.06 |
| 9,876,503 | B2 * | 1/2018 | Vrudhula | H03K 19/21 |
| 2008/0282208 | A1 * | 11/2008 | Anderson | G06F 21/75 716/136 |
| 2011/0113392 | A1 * | 5/2011 | Chakraborty | G09C 1/00 716/102 |
| 2011/0286599 | A1 * | 11/2011 | Tuyls | G06F 21/602 380/278 |
| 2014/0347096 | A1 * | 11/2014 | Afshar | H03K 19/1737 326/41 |

(Continued)

OTHER PUBLICATIONS

B. Zhou, et al. "Cost-efficient Acceleration of Hardware Trojan Detection Through Fan-Out Cone Analysis and Weighted Random Pattern Technique," in IEEE Transactions on Computer-Aided Design of Integrated Circuits and Systems, vol. 35, No. 5, pp. 792-805, May 2016, (Year: 2016).*

*Primary Examiner* — Khalid M Almaghayreh
(74) *Attorney, Agent, or Firm* — Kean Miller LLP; Russel O. Primeaux; Jessica C. Engler

(57) ABSTRACT

The method for obfuscating hardware partially imitates the neural network perceptron, obfuscating the hardware design. This method obfuscates the design functionality and immunes integrated circuits against Trojan insertion. This method can also be used to check for the existence of faults inside chips. This method resolves the concern related to security and reliability when outsourcing the manufacture of integrated circuits.

7 Claims, 9 Drawing Sheets

(56) References Cited

U.S. PATENT DOCUMENTS

| | | | |
|---|---|---|---|
| 2016/0034628 A1* | 2/2016 | Rajendran | G06F 21/75 716/103 |
| 2016/0034694 A1* | 2/2016 | Rajendran | G06F 30/30 713/190 |
| 2016/0197616 A1* | 7/2016 | Cocchi | G06F 30/39 326/41 |
| 2016/0203341 A1* | 7/2016 | Eppensteiner | G06F 13/364 726/23 |
| 2016/0224407 A1* | 8/2016 | Rajendran | G06F 11/0793 |
| 2017/0141930 A1* | 5/2017 | Rajski | G06F 21/75 |
| 2017/0228562 A1* | 8/2017 | Guilley | G09C 1/00 |
| 2018/0012849 A1* | 1/2018 | Kim | G06F 21/75 |
| 2018/0232479 A1* | 8/2018 | Sinanoglu | G06F 21/75 |
| 2019/0079878 A1* | 3/2019 | Chen | H04L 9/0866 |
| 2019/0258766 A1* | 8/2019 | Wang | G06F 30/39 |
| 2019/0311156 A1* | 10/2019 | Tehranipoor | G06F 30/394 |
| 2020/0020364 A1* | 1/2020 | Tsai | G06F 21/73 |

\* cited by examiner

METHOD FOR OBFUSCATION OF
HARDWARE

CROSS REFERENCE TO RELATED
APPLICATION

This application claims priority to the U.S. Provisional Application No. 62/628,552 titled "Method for Obfuscation of Hardware", filed on Feb. 9, 2018.

STATEMENT REGARDING FEDERALLY
SPONSORED RESEARCH OR DEVELOPMENT

Not applicable.

REFERENCE TO A "SEQUENCE LISTING", A
TABLE, OR COMPUTER PROGRAM

Not applicable.

DESCRIPTION OF THE DRAWINGS

The drawings constitute a part of this specification and include exemplary examples of the METHOD FOR OBFUSCATION OF HARDWARE, which may take the form of multiple embodiments. It is to be understood that in some instances, various aspects of the invention may be shown exaggerated or enlarged to facilitate an understanding of the invention. Therefore, drawings may not be to scale.

FIELD OF THE INVENTION

Figure 1:
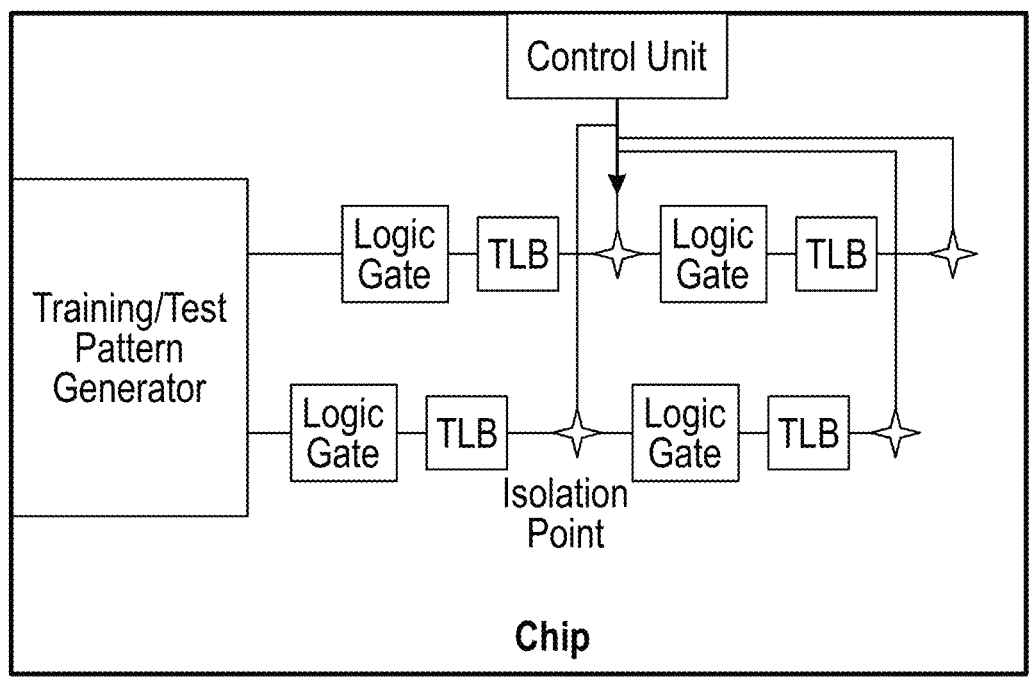
FIG. 1 provides a drawing of the architecture of the METHOD FOR OBFUSCATION OF HARDWARE.

The disclosed invention relates generally to the field of manufacture of integrated circuits. More specifically, this invention relates to the field of obfuscation of the components of integrated circuits to enhance security and prevent counterfeiting.

BACKGROUND OF THE INVENTION

Security is one of the foremost design concerns for integrated circuit (IC) design companies. Due to trends in the Internet of Things (IoT), a chip is deployed in most devices—from home to industry and space. Therefore, IC security issues must be addressed carefully to prevent harmful effects that result from the lack of the security in the chip.

There are two primary factors concerning the security of the chip: confidentiality and integrity. Confidentiality of the chip is defined as the state of hiding the chip functionality from the sight of adversaries such that they are not able to extract the functionality of the chip by using the existing reverse engineering techniques. Integrity is the immunization of the chip against any modifications carried out by an adversary. The modifications are mostly done by inserting an additional hardware into the chip known as a Trojan. By implanting a Trojan, an adversary, aims to either steal sensitive information from the chip or harm the chip by changing its functionality.

A Trojan can be inserted on two separate occasions: pre-fabrication, fabrication. Pre-fabrication Trojan insertion in which someone in a design team tries to alter the functionality of the design by inserting a segment of code in hardware description model of the design.

Fabrication attacks are security breaches that are engaged in the physical construction of the chip. For example, attackers may try to extract the gate level netlist from the chip's layout or implant a Trojan circuit inside the chip. Some incentives for these types of invasions include: intercepting the encryption key, deactivating functionality, and physically damaging the chip.

With all of the current techniques used to safeguard the design of an IC chip, once the manufactured chip is in possession of an adversary, the hardware design can be obtained by the reverse engineering the chip. The majority of fabrication attacks are carried out either by using reverse engineering techniques to extract the functionality of the chip to take ownership of the chip or implanting a Trojan circuit into the design during the fabrication stage.

To strengthen the chip against reverse engineering attacks, hardware obfuscation can be used. Hardware obfuscation can be done at different levels of hierarchy including register transfer level (RTL), gate level, and layout level. In RTL level obfuscation, the design which is mostly in the form of Verilog or VHSIC Hardware Description Language (VHDL) (VHSIC refers to Very High Speed Integrated Circuit) is combined with an encryption circuitry. This approach does not provide a good level of security as the whole design including the encryption circuit is sent to the foundry, and all the logical blocks and interconnections among blocks are easy to track. At gate level, hardware obfuscation techniques are categorized into three different classes (1) logic gate obfuscation; (2) interconnect obfuscation; and (3) configuration obfuscation. Logic gate and interconnect obfuscation are used for hiding some of the logic gates or interconnects such that an adversary cannot extract the functionality of the chip. The configuration obfuscation is used to camouflage the configuration of the reprogrammable parts such as multiplexers or crossbar switches in a tamper-proof memory.

Several obfuscation methods are currently known in the art. Some methods use programmable gates such as XOR and MUX gates to blur the functionality of the circuit and protect the configuration of the programmable blocks inside a PROM. Other methods add additional metal layers as well as meaningful use of filler cells to protect the layout against adversary attempts to extract the gate level netlist of the design. Further existing methods hide some of the logic gates, which make it harder for an attacker to comprehend the functionality of the design. Other methods increase the probability of Trojan detection using transient power-based analysis by inserting dummy flip-flops.

SUMMARY OF THE INVENTION

Herein disclosed is an innovative approach for obfuscation to safeguard chip securities during outsourced manufacturing. This method inherently offers a high degree of obfuscations by integrating security hardware and software based on training of programmable blocks; therefore, it can be a suitable solution for the security of IC with numerous applications, particularly in radio-frequency identification (RFID) chips for IoT, ASIC (application-specific integrated circuit) chips, and medical devices. One of the advantages of the proposed method is that it does not require the use of any PROM for storing the circuits setting. The training based approach imitates a perceptron concept (of the neural network) to build a robust training-based digital logic block. During the manufacturing the functionality of the trainable logic block (TLB) is obscure. To assign the functionality of the chip after the manufacturing, the circuit is trained with training patterns and their corresponding expected output values. The last step is securely controlled by the client after the manufacturing is completed. It reduces the chances of successful reverse engineering and Trojan insertion significantly.

DETAILED DESCRIPTION OF THE INVENTION

The method for obfuscation disclosed herein utilizes both logic gate and interconnect obfuscation by using a perceptron-inspired technique for hardware obfuscation. The architecture of the proposed method is shown in FIG. 1 and comprises three main components: (1) a training/test pattern generator (TPG); (2) a control unit; and (3) trainable logic blocks (TLBs).

TPG is responsible for generating patterns to train TLBs in the circuit. The control unit activates the training/test mode/normal mode. To facilitate the training/testing process, isolation points are inserted right at the output of TLBs to be able to separate them from the rest of the circuit. An isolation point is implemented using a pass transistor, and it can be inserted after each or some of the TLBs depending on the training method and area budget. The control unit controls those isolation points and the expected values for each TLB.

The disclosed method consists of the following primary steps: (1) candidate selection; (2) obfuscation; and (3) training.

Candidate Selection. For the logic gate/interconnect obfuscation, first identify the logic gates and interconnects that are the most critical to the security of the chip. In the preferred method, logic gates with the highest fanout in the design are considered as critical gates, as camouflaging them will be most effective to increase the security of the chip. Since high fanout gates are connected to multiple logic blocks, much data regarding the design will be guarded. Furthermore, the gates and interconnects with different characteristics can be considered as critical depending on the importance of their functionalities.

To further avoid the Trojan insertion, the susceptible interconnects that are more likely to be used by attackers to activate the Trojan need to be protected. Attackers typically use low transition nets for enabling their implanted Trojan circuit. Therefore, an interconnect obfuscation technique is used to hide the characteristics of these types of nets. The output of candidate logic gates and the candidate interconnects are used as an input to the trainable logic blocks (TLBs).

Figure 2A:
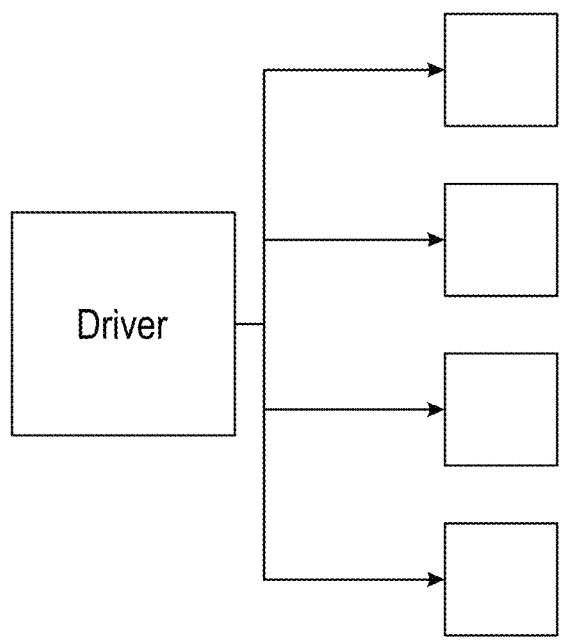
FIG. 2(A) provides a drawing of a section of an example chip, wherein one driver block is driving four other logic blocks.
Figure 2B:
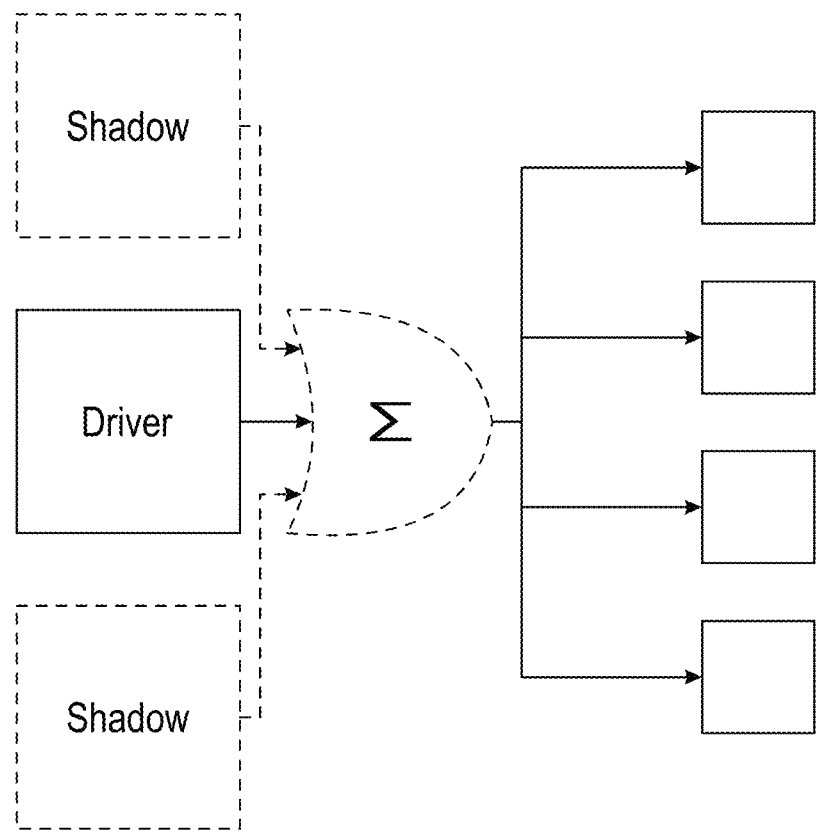
FIG. 2(B) provides a drawing of a section of an example chip, wherein by mixing the gate with two or more shadow cells, the driver cell functionality is hidden.

Obfuscation: Logic Gate Obfuscation. One way to camouflage the candidate logic gates obtained from the first stage is to tangle it with other logic gates. As shown in FIG. 2($a$), one driver block is driving four other logic blocks. Therefore, this is a good candidate for the obfuscation. As illustrated in FIG. 2($b$), by mixing the gate with two or more shadow cells, the driver cell functionality is hidden. A shadow cell refers to an additional logic block that is added to the circuit to hide the critical logic block from the sight of an adversary without changing its functionality. To choose the shadow cells for each driver cell, one or more logic gates that are in its proximity are used. The output of the driver cell and its shadow cells will be the inputs to a TLB.

Figure 3:
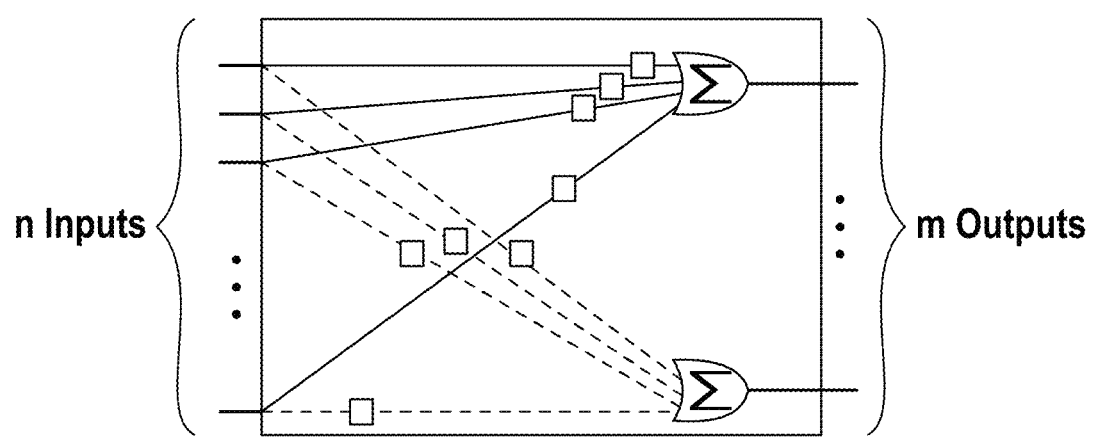
FIG. 3 provides a diagram of the trainable logic block (TLB) structure, wherein each TLB can have n inputs and m outputs where m≤n.

As illustrated in FIG. 3, each TLB can have n inputs and m outputs where m≤n. If the number of inputs to the TLB is equal to the number of its output (n=m), TLB acts as a crossbar switch. For each output, a summation unit is required to sum up some or all of the inputs to the corresponding TLB. If more inputs are added, it results in more security as it increases the complexity of the design at the cost of more area overhead. An output line transmits the result to other logic gates or TLBs. A weight value is assigned to each input net of the TLB. To boost the security of the chip, the weight of each net is stored in a floating gate (FG) transistor. Each square in FIG. 3 represents an FG transistor.

Obfuscation: Interconnect Obfuscation. To protect susceptible inter-connects, low transition nets are camouflaged through interconnect obfuscation. To obfuscate a low transition net, it can be mixed with other nets, which can be low or high toggle rate nets, and the other nets are the inputs to a TLB.

Obfuscation: Configuration Obfuscation. To avoid the reverse engineering attacks that are carried out after the testing of the chip, we need to obfuscate the configurations of each TLB. The configuration of each TLB can be compromised easily in regular CMOS transistors. Therefore, we use nonvolatile memory (NVM) to protect each configuration line. NVM is preferred because it has faster read/write operation and less power consumption. It also can be used for hardware security purposes. NVM is made of floating gates (FG) transistors. Floating gate is surrounded by oxide layers, and there is no direct access to the floating gate area. The FG is programed by using hot carrier injections (HCI) and Fowler-Nordheim Tunneling. HCI is used to program or inject the electron into the floating gate. A shift in threshold voltage of the transistor to a higher value is used if there is charge trapped in the floating gate. Trapped electrons hinder the movement of electrons between source and drain.

Training. All the candidate logic gates and interconnects are sent to the training stage in the form of TLBs. A training-based approach is implemented to offer another degree of uncertainty and to enhance obfuscation at gate level to further challenge adversaries. The training-based approach consists of three modules: (1) a training pattern generator (TPG), which is responsible for applying training patterns to train a connectivity network of TLBs; (2) a response analyzer that is responsible for seeing if there is an error in the system, where an error refers to any difference between the TLBs output and the expected value; and (3) weight update unit which change the weights for determining if a net stay connected/disconnected.

Figure 4A:
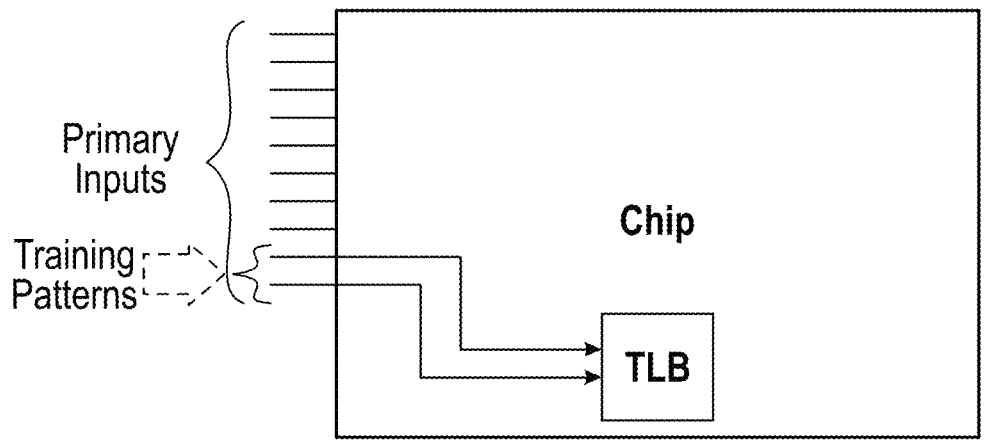
FIG. 4(A) provides a diagram of a set of training patterns being applied directly to the inputs of the TLB.
Figure 4B:
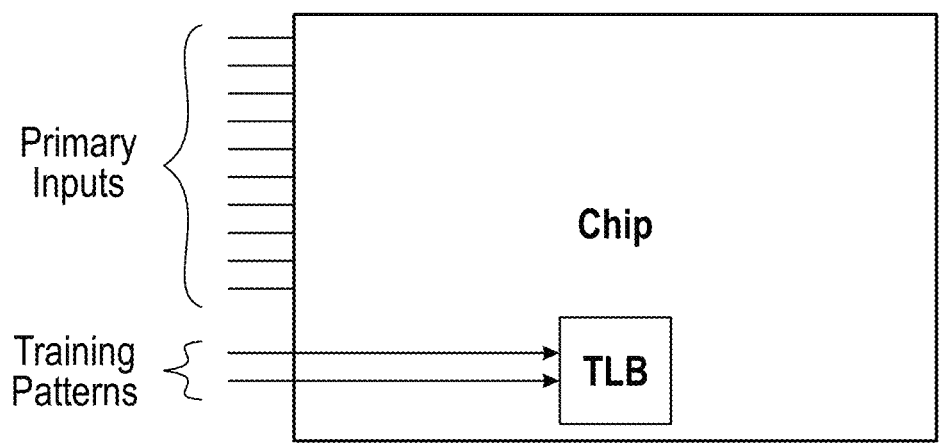
FIG. 4(B) provides a diagram of a set of training patters being injected from the primary inputs of the chip and propagated through the circuit to reach the target TLB input pins, so the input patterns are traveled through the network of interconnects until they reach out to the input pin(s) of the TLB.

In order to build/train the TLB, a set of training patterns are applied to the inputs of the TLB, as shown in FIG. 4. Training patterns and their corresponding expected value can be stored in an NVM. These values can be either kept after the configuration or erased. It is extremely laborious for an attacker to read the on/off states of FG transistors inside the NVM ROM. Another way can be by using a similar Built-in-self-test (BIST) structure that uses a random pattern generator.

Figure 5:
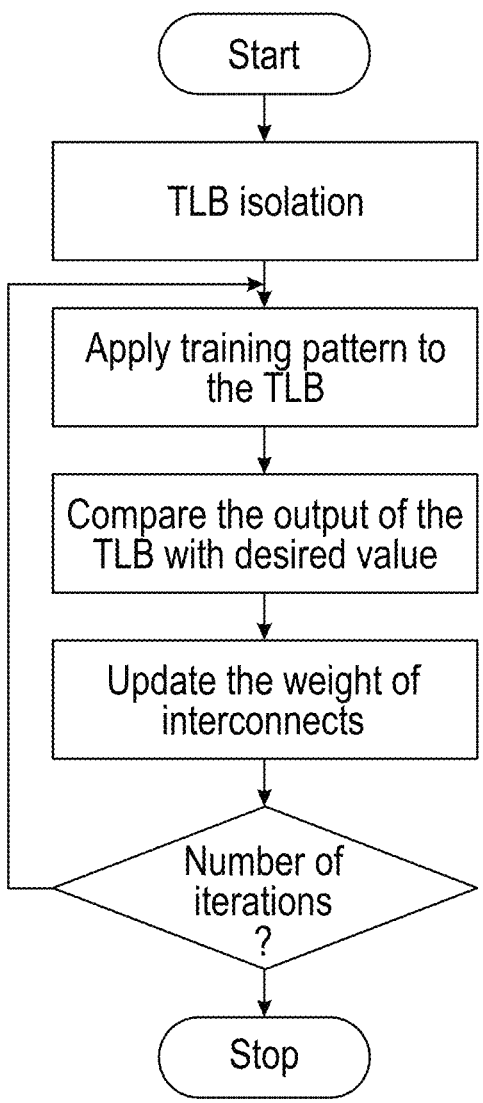
FIG. 5 provides a diagram of the flow of the proposed approach for the training of the trainable blocks.

Different architecture can be used for the response analyzer. For analyzing the results, an XOR/XNOR gate has been used to compare the output of the TLB with the expected value for the corresponding training pattern. The flow of the proposed approach for the training of the trainable blocks is shown in FIG. 5. First, the subcircuit is isolated from the rest of the circuits before the training begins. By providing the training patterns and comparing them with expected values, the weights of the interconnects are updated through iterations until all the subcircuits are programmed. The number of iterations varies based on the number of TLBs in the chip under training. Another factor that affects the number of iterations is the way the TLBs are trained. Training of TLBs can be done in serial in which one TLB at a time is trained or parallel where multiple TLBs are programmed at a time.

Figures 7, 8:
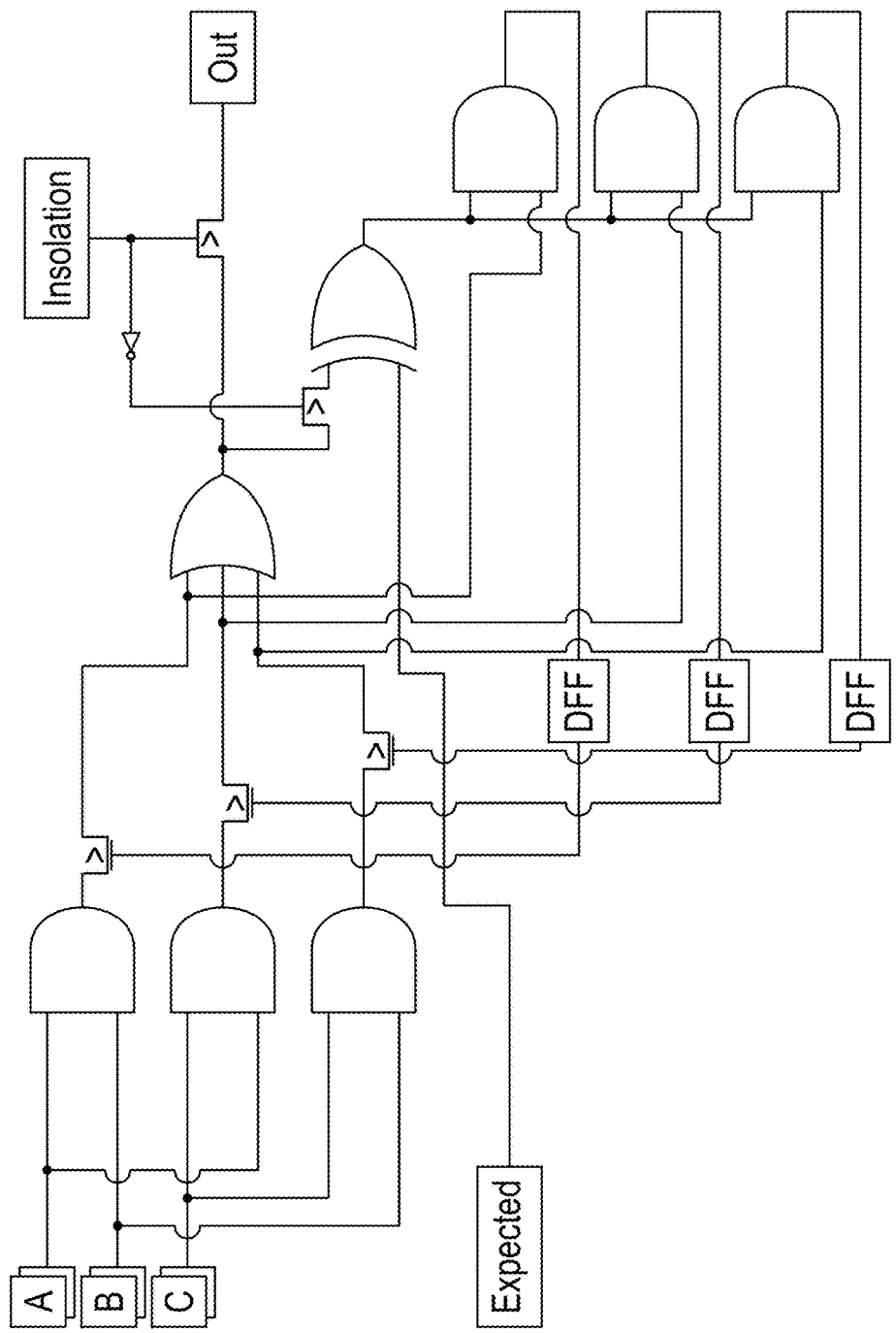
FIG. 7 shows a drawing of the example proposed architecture for obfuscating the (A&B) gate shown in FIG. 6.
FIG. 8 provides a table of the training patterns for training the example depicted in FIGS. 6 and 7

During the training mode, which is decided by the control unit, the target TLB is isolated from the rest of the circuit. The isolation process is done by adding a pass transistor at each TLB's output. Then the input patterns generated by TPG are applied to the TLB inputs (during the normal mode TPG is not active). In the preferred embodiment, only one training pattern and its corresponding expected output value is applied to the TLB at a time by a strobe signal. A training pattern can be applied to one or multiple TLBs at a time. The training patterns either can be applied directly to the TLB inputs (FIG. 4(b)), or they can be injected from the primary inputs of the chip and propagated through the circuit to reach the target TLB input pins, so the input patterns are traveled through the network of interconnects until they reach out to the input pin(s) of the TLB (FIG. 4(a)). An OR gate before the output of the TLB to sum all of its internal nets. The summation value is the output, and it is compared with the expected output coming from the control unit. The D Flip Flop ("DFF") of those nets that are contributing to the correct (expected) value will remain intact, while DFF of the nets resulting in a wrong output will be punished or decremented To implement this, each internal net of TLB is specified by weight as shown in FIG. 7. Each net's weight is denoted by two values: zero and one stored in its DFF. A DFF of a net with one weight implies that the net is connected and a net which its weight is equal to zero implies the net is disconnected. The weight of all internal nets before the start of training is set to one. When you program the gate of FG by applying high voltage (+15 V) then electron traps in the oxide and threshold voltage ($V_{th}$) will be increased; that means transistor is off. The weight of each net is stored in a register made of DFF which triggers the high voltage to program the floating gate transistor to establish the connection, and its value only updates during the training process. To update the weight of a net, a DFF is used. A DFF high output signals the Hot electron (HE) injection circuitry to apply a high voltage to FG's gates to turn them off. At the end of the training step, nets whose DFFs stores one will remain intact while the rest will have to be discharged. Fowler-Nordheim (FN) tunneling is used for storing and removing charge from an FG. Processes for charging and discharging the floating gate transistors are known in the art.

The training patterns can be stored inside a traditional ROM. However, since the expected target values are very critical, in the preferred embodiment, the values are stored in EEPROM that can be erased later. The adversary cannot access anticipated output values, and said expected values can be removed right after the end of the training. As a result, the disclosed method brings a significant security to the chip.

After the training the TLB, the isolation cell will be activated, and the other TLBs are trained until all of the TLBs are programmed. In order to reduce the area overhead for the training circuitry, one training circuitry can be shared among different TLBs.

Another advantage of the disclosed method approach is fault detection. If the output value of the TLB does not match the expected value, it implies the existence of a fault or a malware inside the design. We need to define the fault existence criteria as an example we can consider, if the weights of all interconnects are zero, it can be a sign of the existence of a fault in the circuit. But in practice, the weights of all interconnects can be zero, which means this net is a disconnected net and it is used to confuse the adversary. Therefore, by this approach not only the obfuscated blocks are trained, but it can also be used to check the existence of faults inside the TLB or in its prior circuitry, depending on how the training patterns are applied to each TLB. If training patterns are directly applied to the inputs of the TLB, it can identify the fault inside the TLB. While, if the training patterns traverse through other logic blocks to reach out to the input of the TLB, it can notify the existence of fault inside the TLB or its prior circuits.

Figure 6A:
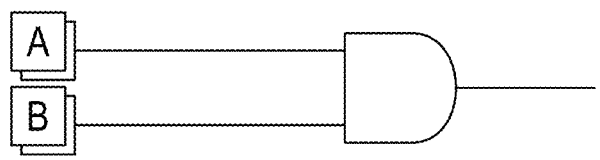
FIG. 6 shows a drawing of a chip wherein the (A&B) gate is camouflaged with two other AND gates.
Figure 6B:
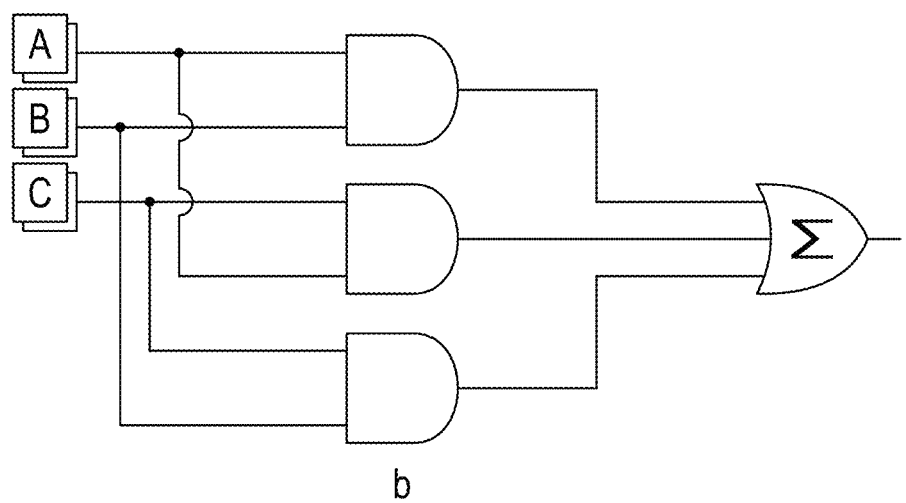

An example is now provided. In FIG. 6, (A&B) gate is camouflaged with two other AND gates. The proposed architecture for obfuscating (A&B) is depicted in FIG. 7. In this example, to obfuscate an (A&B) gate, it is mixed with two other AND gates (A&C) and (B&C). During the manufacturing, all of three AND gates are in use. After the training, based on the patterns generated by the TPG applied to the circuit, the target gate can be configured. In this example, after the training of the chip, A&B is the only gate which is driving the block out.

Figure 9:
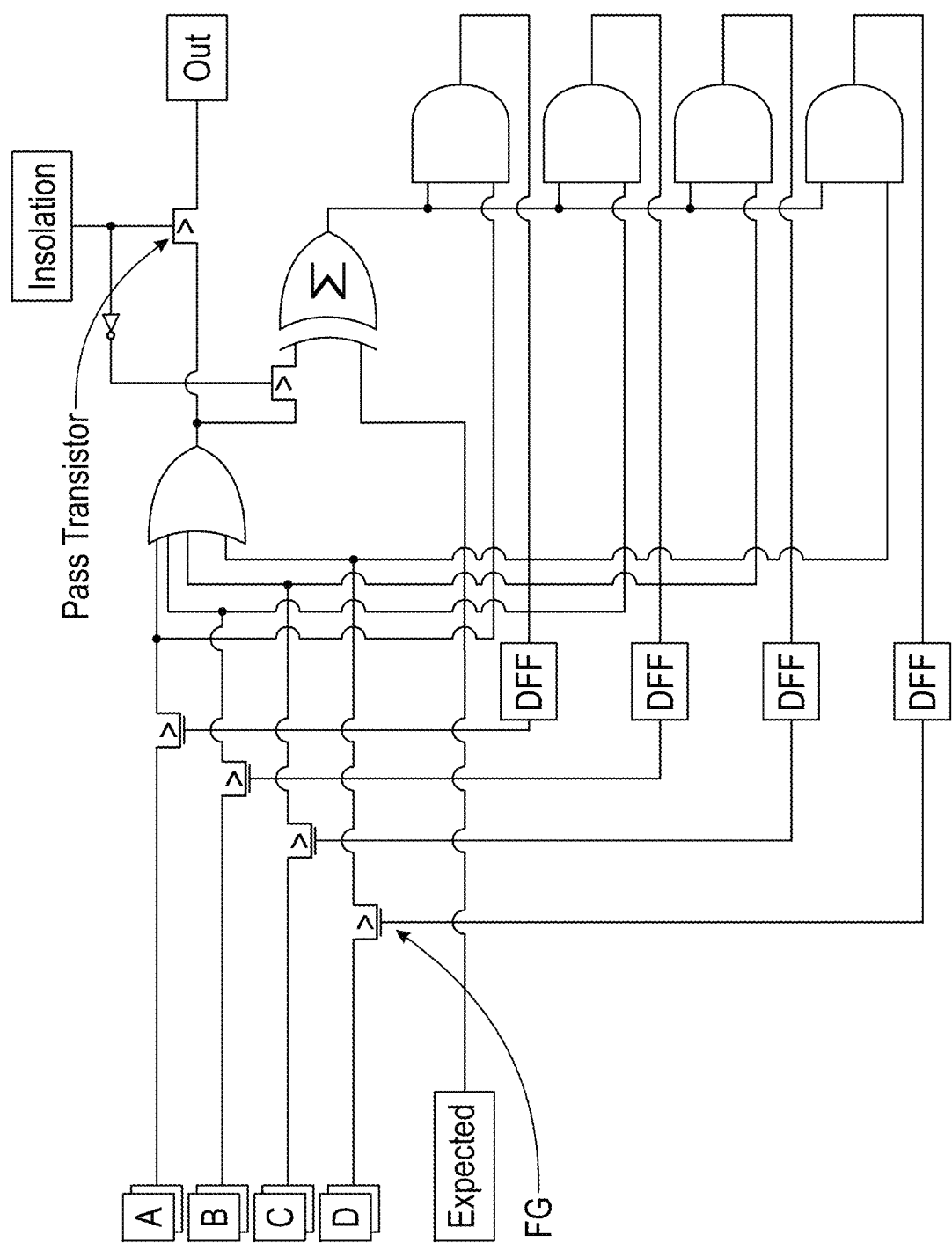
FIG. 9 shows and example interconnect obfuscation, which demonstrates how to camouflage net A which is a low transition net with three other nets B, C, D.

These two patterns are enough to configure A&C. This configuration will be fixed and it is not changeable. Training patterns for training the example in FIG. 7 is shown in FIG. 9. After iterations, the configuration is not changeable.

Example interconnect obfuscation is shown in FIG. 9, which demonstrates how to camouflage net A which is a low transition net with three other nets B, C, D. After applying the training pattern (0111) and its expected output value (0) to the design, the input A will be connected to the output. This connection will remain fixed forever. The behavior of the proposed method for interconnect obfuscation is similar to a multiplexer with a fixed path. The disclosed method is scalable compared to the traditional multiplexers. Also, each input line to the OR gate is protected by a floating gate transistor, and there are no visible select lines. Consequently, it produces more security.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A method for obfuscating a hardware of an integrated circuit comprising:
   wherein the integrated circuit comprises:
      two or more logic gates;
      two or more transition nets;
      a training pattern generator;
      a control unit; and
      at least one trainable logic block, comprising:
         at least one input; and
         a configuration line;
   inserting at least one isolation point into at least one output of the trainable logic block;
   identifying at least one candidate logic gate;
   identifying at least one candidate interconnect;
   using an output of the at least one candidate logic gate and an output of the at least one candidate interconnect as inputs for the trainable logic block;
   tangling the at least one candidate logic gate with at least one other logic gate;
   mixing at least one low transition net of the candidate interconnect with at least one other low transition net, wherein any remaining low transition nets comprise inputs to the trainable logic block, wherein a low transition net comprises a net that has a low transition activity;
   providing nonvolatile memory, wherein said nonvolatile memory protects at least one configuration line; and
   training the at least one trainable logic block, comprising:
      providing three modules comprising:
         the training pattern generator;
         a response analyzer; and
         a weight update unit;
      selecting a training pattern;
      selecting a corresponding value for the training pattern;
      generating of an input pattern by the training pattern generator;
      isolating the at least one trainable logic block to be trained; and
      applying the training pattern individually to each at least one trainable logic block.

2. The method of claim 1, wherein the at least one isolation point is inserted at at least one output of the trainable logic block.

3. The method of claim 1, wherein the at least one isolation point comprises a pass transistor.

4. The method of claim 1, wherein the at least one isolation point comprises a high fan-out.

5. The method of claim 1, wherein the nonvolatile memory comprises floating gate transistors.

6. The method of claim 1, wherein the training step comprises:
   providing three modules comprising:
      the training pattern generator;
      a response analyzer; and
      a weight update unit;
   selecting a training pattern;
   selecting a corresponding value for the training pattern;
   generating of an input pattern by the training pattern generator; and
   applying the training pattern to at least one trainable logic block.

7. The method of claim 1, wherein the training step comprises:
   providing three modules comprising:
      the training pattern generator;
      a response analyzer; and
      a weight update unit;
   selecting a training pattern;
   selecting a corresponding value for the training pattern;
   generating of an input pattern by the training pattern generator; and
   applying the training pattern to at least one trainable logic block by the training pattern generator.

* * * * *